United States Patent
Van Der Wal et al.

(10) Patent No.: US 10,759,682 B2
(45) Date of Patent: Sep. 1, 2020

(54) METHOD TO PREPARE A COATED CURRENT COLLECTOR ELECTRODE FOR A FLOW THROUGH CAPACITOR USING TWO SOLVENTS WITH DIFFERENT BOILING TEMPERATURE

(71) Applicant: VOLTEA B.V., Sassenheim (NL)

(72) Inventors: Albert Van Der Wal, Oegstgeest (NL); Raúl Cubedo Castelló, Leiden (NL); Freddie Kerpels, Hoogvliet (NL); Hank Robert Reinhoudt, Wassenaar (NL)

(73) Assignee: Voltea Limited, London (GB)

( * ) Notice: Subject to any disclaimer, the term of this patent is extended or adjusted under 35 U.S.C. 154(b) by 631 days.

(21) Appl. No.: 15/320,744

(22) PCT Filed: Jul. 1, 2015

(86) PCT No.: PCT/EP2015/065029
§ 371 (c)(1),
(2) Date: Dec. 20, 2016

(87) PCT Pub. No.: WO2016/001325
PCT Pub. Date: Jan. 7, 2016

(65) Prior Publication Data
US 2017/0129791 A1    May 11, 2017

(30) Foreign Application Priority Data
Jul. 2, 2014    (EP) ...................................... 14175475

(51) Int. Cl.
*C02F 1/461* (2006.01)
*C02F 1/469* (2006.01)
(Continued)

(52) U.S. Cl.
CPC ........ *C02F 1/46109* (2013.01); *C02F 1/4691* (2013.01); *C02F 5/00* (2013.01);
(Continued)

(58) Field of Classification Search
CPC ...... C02F 1/46109; C02F 1/4691; C02F 5/00; C02F 2101/163; C02F 2103/003;
(Continued)

(56) References Cited

U.S. PATENT DOCUMENTS 6,709,560 B2    3/2004    Andelman et al.
8,518,229 B2    8/2013    Yang et al.
(Continued)

FOREIGN PATENT DOCUMENTS

EP    0 054 984    6/1982
EP    2 070 875    6/2009
(Continued)

OTHER PUBLICATIONS

International Written Opinion dated May 10, 2016 in corresponding International Patent Application No. PCT/EP2015/065029.
(Continued)

*Primary Examiner* — Arun S Phasge
(74) *Attorney, Agent, or Firm* — Pillsbury Winthrop Shaw Pittman LLP (57) ABSTRACT

A method to prepare a coated current collector electrode of a flow through capacitor. The method includes preparing a coating paste includes: 10-50 weight % of carbon having a specific surface area of at least 500 $m^2/g$; 0.3-5 weight % of a binder; 10-50 weight % based on the total paste of a first solvent having a first boiling point; and 10-50 weight % based on the total paste of a second solvent having a second boiling point. The method further includes applying the coating paste on a current collector; and allowing the second solvent in the coating paste applied on the current collector
(Continued)

to evaporate at a temperature lower than the first boiling point.

20 Claims, 3 Drawing Sheets

(51) Int. Cl.
| | |
|---|---|
| *C02F 5/00* | (2006.01) |
| *C02F 101/10* | (2006.01) |
| *C02F 101/14* | (2006.01) |
| *H01G 11/24* | (2013.01) |
| *H01G 11/38* | (2013.01) |
| *H01G 11/28* | (2013.01) |
| *C02F 101/16* | (2006.01) |
| *C02F 103/00* | (2006.01) |
| *C02F 103/02* | (2006.01) |
| *C02F 103/04* | (2006.01) |
| *C02F 103/06* | (2006.01) |
| *C02F 103/10* | (2006.01) |
| *C02F 103/28* | (2006.01) |
| *C02F 103/42* | (2006.01) |

(52) U.S. Cl.
CPC .............. *C02F 2001/46138* (2013.01); *C02F 2101/103* (2013.01); *C02F 2101/14* (2013.01); *C02F 2101/163* (2013.01); *C02F 2103/003* (2013.01); *C02F 2103/023* (2013.01); *C02F 2103/04* (2013.01); *C02F 2103/06* (2013.01); *C02F 2103/10* (2013.01); *C02F 2103/28* (2013.01); *C02F 2103/42* (2013.01); *C02F 2201/4618* (2013.01); *H01G 11/24* (2013.01); *H01G 11/28* (2013.01); *H01G 11/38* (2013.01)

(58) Field of Classification Search
CPC ............ C02F 2103/023; C02F 2103/04; C02F 2103/06; C02F 2103/10; C02F 2103/28; C02F 2103/42; C02F 2201/4618; C02F 2001/46138; C02F 2101/103; C02F 2101/14; H01G 11/24; H01G 11/28; H01G 11/38
See application file for complete search history.

(56) References Cited

U.S. PATENT DOCUMENTS

| | | |
|---|---|---|
| 9,187,348 B2 | 11/2015 | Yang et al. |
| 2007/0141446 A1 | 6/2007 | Choi et al. |
| 2009/0020430 A1* | 1/2009 | Yang .................... C02F 1/4691 |
| | | 204/660 |
| 2010/0170784 A1 | 7/2010 | Yang et al. |
| 2013/0194723 A1 | 8/2013 | Felten et al. |

FOREIGN PATENT DOCUMENTS

| | | |
|---|---|---|
| EP | 2 471 869 | 7/2012 |
| WO | WO 01/088934 | 11/2001 |
| WO | WO 2009/020430 | 2/2009 |
| WO | WO 2009/062872 | 5/2009 |
| WO | WO 2009/087268 A1 | 7/2009 |
| WO | WO 2010/131951 | 11/2010 |

OTHER PUBLICATIONS

International Search Report dated Jun. 23, 2016 in corresponding International Patent Application No. PCT/EP2015/065029.
Extended European Search Report dated Apr. 22, 2015 in corresponding European Patent Application No. 14175475.4.
Ayu Tyas Utami Nugrahenny et al., "Development of High Performance Cell Structure for Capacitive Deionization using Membrane Polymer-Coated Electrode", CISAK 2013—Conference of the Indonesian Students Association at Korea (PERPIKA), Daejeon, South Korea Jul. 6-7, 2013, Downloaded from URL: http://cisak.perpika.kr/wp-content/uploads/2013/07/2013-58.pdf., 4 pages.
Suman Roy Choudhury, "Phosphoric Acid Fuel Cell Technology", Recent Trends in Fuel Cell Science and Technology, 2007, p. 191.

* cited by examiner

METHOD TO PREPARE A COATED CURRENT COLLECTOR ELECTRODE FOR A FLOW THROUGH CAPACITOR USING TWO SOLVENTS WITH DIFFERENT BOILING TEMPERATURE

This application is the U.S. national phase entry of PCT patent application no. PCT/EP2015/065029, which was filed on Jul. 1, 2015, which claims the benefit of priority of European patent application no. 14175475.4, which was filed on Jul. 2, 2014.

FIELD

The invention relates to a method to prepare a coated current collector electrode for a flow through capacitor, the method comprising:
a preparing a coating paste with a solvent:
b applying the coating paste on a current collector; and,
c allowing the solvent in the coating paste applied on the current collector to evaporate.

BACKGROUND

In recent years one has become increasingly aware of the impact of human activities on the environment and the negative consequences this may have. Ways to reduce, reuse and recycle resources are becoming more important. In particular, clean water is becoming a scarce commodity. Therefore, various methods and devices for purifying water have been published.

A method for water purification is by capacitive deionisation, using an apparatus provided with a flow through capacitor (FTC) for removal of ions in water. The FTC functions as an electrically regenerable cell for capacitive deionisation. By charging electrodes, ions are removed from an electrolyte and are held in electric double layers at the electrodes. The electrodes can be (partially) electrically regenerated to desorb such previously removed ions without adding chemicals.

The apparatus for removal of ions comprises one or more pairs of spaced apart electrodes (each pair of electrodes comprising a cathode and an anode) and a spacer, separating the electrodes and allowing water to flow between the electrodes. The electrodes are provided with current collectors or backing layers and a high surface area material, such as e.g. carbon, which may be used to store removed ions. The current collectors may be in direct contact with the high surface area material. Current collectors are electrically conductive and transport charge in and out of the electrodes and into the high surface area material.

A charge barrier may be placed adjacent to an electrode of the flow-through capacitor. The term charge barrier refers to a layer of material which is permeable or semi-permeable for ions and is capable of holding an electric charge. Ions with opposite charge as the charge barrier charge can pass the charge barrier material, whereas ions of similar charge as the charge of the charge barrier cannot pass or only partially pass the charge barrier material. Ions of similar charge as the charge barrier material are therefore contained or trapped either in e.g. the electrode compartment and/or in the spacer compartment. The charge barrier is often made from an ion exchange material. A charge barrier may allow an increase in ionic efficiency, which in turn allows energy efficient ion removal.

International patent publication WO 2010/131951 discloses a method for preparing a coated current collector for an electrode for a flow through capacitor. The method comprises preparing an anode coated current collector using water as a solvent. The coated current collectors may be dried in an oven, which may result in a significant reduction in electrode thickness. This way dense electrodes can be obtained by drying the carbon coatings at elevated temperatures.

United States patent publications US 2009/0020430 and US 2010/0170784 disclose the preparation of a coating comprising water, 1-butanol, polyurethane and a carbon mixture. The coating is coated on a carbon paper and dried at room temperature at 80° Celsius.

Some solvent, may be normally retained in the carbon coated current collector after this has been dried in an oven. In fact the retention of solvent in the carbon coated current collector is often beneficial, because it prevents cracking of the carbon coated electrode. Nevertheless, there may be some further drying if the current collectors are stored and/or transported. This further drying may influence the flexibility of the current collectors such that cracks may appear in the carbon coated current collectors for example when they are bended. Cracks may have a negative influence on the working of the carbon coated current collectors and in general cracks should be avoided.

SUMMARY

It is an objective of the invention to provide an improved method for preparing a carbon coated current collector electrode for a flow through capacitor.

Accordingly there is provided a method to prepare a coated current collector electrode for a flow through capacitor, the method comprising:
a preparing a coating paste comprising by weight %:
  10-50 weight % of carbon having a specific surface area of at least 500 m2/g;
  0.3-5 weight % of a binder;
  10-50 weight % based on the total paste of a first solvent having a first boiling point; and,
  10-50 weight % based on the total paste of a second solvent having a second boiling point, the second boiling point being lower than the first boiling point;
b applying the coating paste onto a current collector; and,
c allowing the second solvent in the coating paste applied on the current collector to evaporate at a temperature lower than the first boiling point, the first boiling point is larger than 120° C. at 1 atm.

In this way it becomes possible to evaporate the second solvent while the first solvent remains in the coated current collector. By allowing the second solvent in the coating paste applied on the current collector to evaporate at a temperature lower than the first boiling point of the first solvent, the first solvent may be chosen to have a high boiling point and may not evaporate. In this way it is assured that during storage and/or transport enough of the first solvent will remain in the coated current collector to avoid cracking of the coated current collector.

The first solvent may be present in 20-40 weight %, or 25-35 weight %, based on the total paste.

The first solvent may comprise an alcohol such as a polyol (e.g. a triol or a diol).

The first solvent may be glycerol, glycerol has a low toxicity so that leaching of the glycerol will not contaminate water in contact with the coated current collector.

The glycerol may be a food grade glycerol such that the coated current collector electrode may be used for drinking water applications.

Glycerol has a boiling temperature of 290° Celsius at 1 atm. (please check) and therefore will not evaporate from the coated electrode during transport and storage. Cracking of the coated electrode is therewith circumvented.

The first solvent may be a glycol.

The second solvent may be water with a boiling point of 100° C. at 1 atm. The coating composition with water as a solvent is quite well known such that the coating may not need much adaptation to different solvents. Remaining water in the current collector will not contaminate water in contact with the coated current collector during use.

The coating paste may be applied by paste-, blade-, dip-spray- or spin coating or by gravure roll coating, extrusion coating or by lamination or screen printing.

With the method a coated current collector functioning as an electrode for a flow through capacitor may be produced.

The coated current collector (electrode) may be used in an apparatus for removal of ions, the apparatus being provided with a housing, the apparatus comprising:

a water inlet for water entering an interior of the housing;

a water outlet for letting water out of the interior of the housing;

a first and second coated current collector; and, a spacer for separating the coated current collectors and allowing water to flow in between the coated current collectors.

According to a further embodiment the invention may relate to a coating for a current collector for a flow through capacitor comprising:

15-80 weight % of carbon having a specific surface area of at least 500 m2/g; and, 0.45-7.5 weight % of binder, wherein the coated current collector further comprises:

15-80 weight % of a first solvent having a boiling temperature at atmospheric pressure larger than 120° C. at 1 atm.

These and other aspects, features and advantages will become apparent to those of ordinary skill in the art from a reading of the following detailed description and the appended claims. For the avoidance of doubt, any feature of one aspect of the present invention may be utilised in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

BRIEF DESCRIPTION OF THE FIGURES

Embodiments of the invention will be described, by way of example only, with reference to the accompanying schematic drawings in which corresponding reference symbols indicate corresponding parts, and in which.

DETAILED DESCRIPTION OF AN APPARATUS FOR REMOVAL OF IONS

Figure 1:
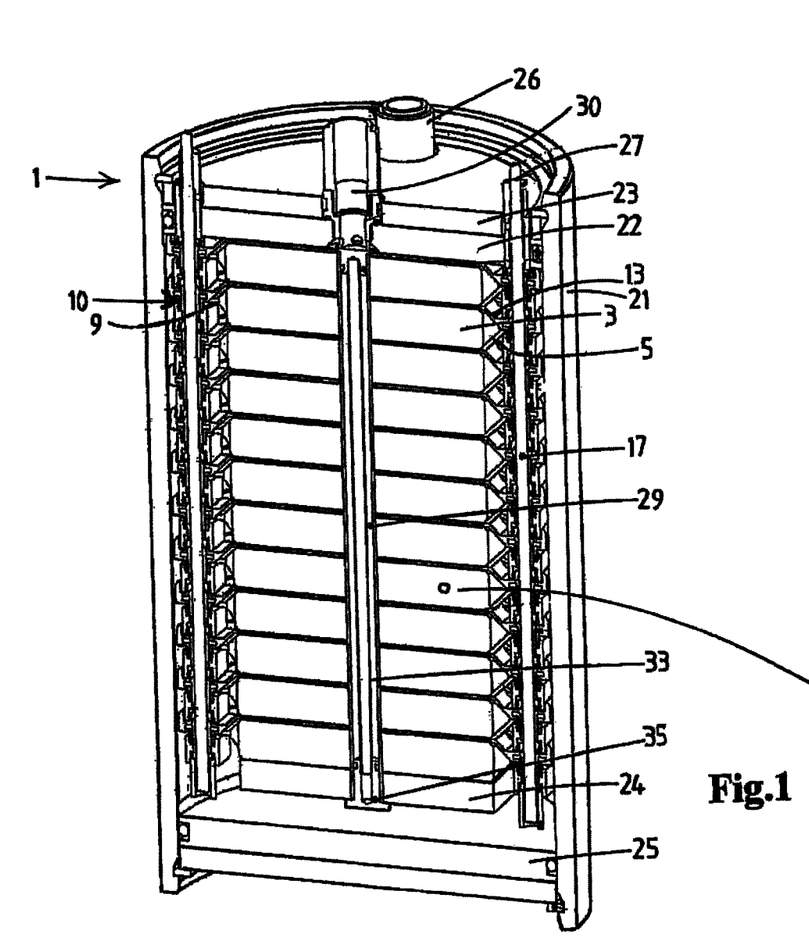
FIG. 1 shows a schematic cross-section of an apparatus for removal of ions.
Figure 2A:
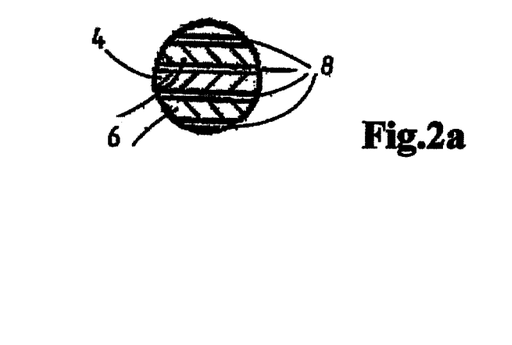
FIG. 2a shows a detail enlargement of the stack 3 of FIG. 1.

FIG. 1 shows a schematic cross-section of an apparatus for removal of ions 1 produced with a method according to the invention with a part of the housing removed. In the example the apparatus may comprise twelve flow through capacitor stacks 3. The flow through capacitor stack 3 may be provided with repeating units of a first electrode 4 (see FIG. 2a, which is an enlargement of a stack), a spacer 8, and a second electrode 6. The first electrode 4 may be provided with a first current collector 5, (see FIG. 1) which may be bundled together with a first connector 11. The second electrode 6 may be provided with a second current collectors 9, which may equally be bundled together on the other side of the apparatus with the second connector 10.

Figure 2B:
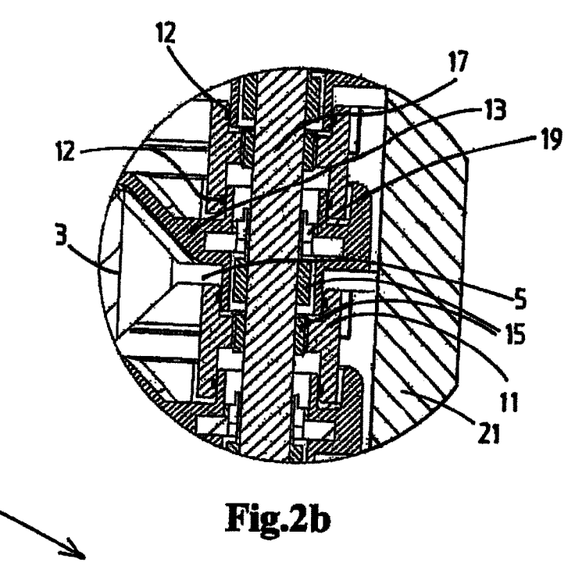
FIG. 2b shows a detail of FIG. 1.

The first connector 11 (see FIG. 2b, which is a partial enlargement of FIG. 1) may be used to clamp the first current collectors 5 together. The current collectors 5, 9 and the first connector 11 and the second connector 10 may be made of the same material e.g. carbon (e.g. graphite) to lower the electrical resistivity between the current collectors 5, 9 and the connectors 11, 10. The first connector 11 may be provided with inserts 15 e.g. from a metal, such as, for example copper. The inserts 15 may be screwed in the first connector 11 so as to assure low electrical resistivity between the insert 15 and the first connector 11. The power terminal 27 is a construction that is connected to both the power supply and one or more connectors 10, 11. The power terminal 27 may be fixed into the upper and/or bottom part 22, 24 and/or any other part of the housing. The power terminal 27 may be provided with a rail e.g. rod 17 made of, for example, metal e.g. copper to electrically connect all the first connectors 11 via their inserts 15 to a power source (not shown). The first connector 11 and the insert 15 may be provided with an opening for the rod 17. The inserts 15 and the rod 17 may be shielded of from the water inside the apparatus by e.g. resin, glue or a paste which functions as a water barrier. The resin, glue or a paste or any other water shielding material may optionally be applied to the hollow parts 19 of the connector 11 after compression of the stack. To circumvent that the resin may contaminate the stack 3 rubber rings 12 may be provided in the insert 15. A tray 13 may be provided to help manufacturing one stack 3 and assembling the stacks 3 together in a housing 21 of the apparatus. Within the housing the stacks 3 may be compressed between the top and bottom part 22, 24. The top part 23 of the housing 21 is provided with a feed-through allowing the rod 17 to make a connection with a power source. This way electrical charge can enter the first electrode via the first current collector 5 and also leave the electrode again, e.g. during regeneration of the electrodes. Water may be provided to an interior of the apparatus via a water inlet 26 the water is allowed to flow around the flow through capacitor stacks 3 and may enter the stacks via the spacers. The flow through capacitor stack 3 is provided with a hole in the middle of the stack. In the hole a circular tube 29 is provided and via the space between the hole and the tube the water may flow to an outlet 30. The interior of the tube 29 may be provided with a nut 35 and threaded bar 33 which may help to compress the electrodes in the stacks 3 and for compressing the stacks 3 between the upper and bottom part 22, 24 of the housing 21.

Compressing may occur during production of the apparatus, or optionally during maintenance. By compressing all the stacks at once it may be assured that the compression force is very similar or even equal for each stack and at the same time equally or homogeneously distributed over the surface of the electrodes.

During manufacturing of the stack 3 a first electrode comprising a first current collector 5 may be provided in the tray 13. A spacer may be located on top of the first electrode; and a second electrode may be put on top of the spacer. Subsequently a spacer may be put on top of the second electrode followed by another first electrode. This may be repeated until for example 10 first and second electrode units are provided in the stack 3 held by the tray 13 each first electrode separated from a second electrode with a spacer. Subsequently a connector part 11 may be located on top of the current collectors 5 and a metal insert 15 may be screwed from the other side of the stack 3 through the tray 13 and the first current collectors 5 to fix the stack 3 to the tray 13.

The tray 13 and the stack 3 may be connected to the rod 17 of the first power terminal 27 by sliding the insert 15 over the rod 17 to allow a good electrical contact. The hole in the insert 15 may be of such a size that it allows for good electrical contact between the insert 15 and the rod 17 and at the same time allowing the insert 15 to slide over the rod 17. The connector 11 may be pressed on the tray 13 with the current collector 5 or multiple current collectors 5 in between the connector 11 and the tray 13 by screwing of the insert 15 in the connector part 11. To assure good electrical conductivity between the connector 11 and the first current collector 5 the pressure on the connector part 15 and the current collector may be less than 100 Bar, preferably less than 50 Bar, more preferably less than 20 Bar and most preferably around 10 Bar.

Multiple stacks 3 can be connected to the rod 17 and the stacks 3 may be connected in a similar way to the second connector 10. A force may be exerted on the stacks 3 with the nut 35 and threaded bar 33 via the upper and bottom part 22, 24 so as to compress the first and second electrode in a first direction parallel to the length of the threaded bar 33 which is perpendicular to the main surface of the electrode. The force may exert a pressure on the stack of less than 5 Bar, preferably less than 3 Bar.

The first and second connector 11, 10 allow for movement of the first and second current collector 5, 9 along the rod 17, 18 in the first direction such that the current collectors are not damaged by the compression force on the stack 3. The movements may be in the order of 0.05 to 10% of the height of the multiple stacks 3 in the first direction. After enough pressure is exerted on the stack a resin or grease may be provided along or through the first and/or second connector 11, 10 in the hollow parts 19 of the connectors 10, 11. The resin after hardening fixes the position of the connectors 10, 11 and may protect the (metal) inserts 15 and rod 17 from corrosion.

The apparatus may be operated with the following steps:
allowing water to flow in between a first electrode 4 and a second electrode 6 of a capacitor;
charging the capacitor with an electrical charge via a controller C in order to attract ions into the electrodes 4, 6.
releasing ions from the electrodes by releasing electrical charge from the capacitor via the controller. In order to obtain stable operation, it may be important for the apparatus to determine the moment to switch from charging the electrode to releasing ions from the electrode and vice versa.

Preparation of a Coated Current Collector for an Electrode

A method to prepare a coated current collector electrode for a flow through capacitor comprises:

a preparing a coating paste comprising by weight %:
   10-50 weight % of carbon having a specific surface area of at least 500 m2/g;
   0.3-5 weight % of a binder;
   10-50 weight % based on the total paste of a first solvent having a first boiling point; and,
   10-50 weight % based on the total paste of a second solvent having a second boiling point;
b applying the coating paste on a current collector; and,
c allowing the second solvent in the coating paste applied on the current collector to evaporate at a temperature lower than the first boiling point.

Carbon

The carbon in the coating comprises activated carbon, and optionally any other carbon material, such as carbon black. The activated carbon may be steam activated or chemically activated carbon, preferably steam activated carbon, such as DLC A Supra Eur (ex Norit). The carbon preferably has a specific surface area of at least 500 m2/g, preferably at least 1000 m2/g, more preferable at least 1500 m2/g. The anode and cathode may even be made out of different carbon materials. The higher the carbon surface area is, the higher is the ion storage capacity of the current collector. The specific surface area of carbon may for instance be measured by the B.E.T. method, as commonly used in the art.

The carbon may be present in the coating in a concentration of at least 50%, preferably at least 60%, more preferable at least 70%, or even at least 75% by weight of the dry coating. The composition generally does not contain more than 98.5% by weight of the dry coating of carbon.

Binder

The binder may be mixable with carbon material. Preferably the binder is a water based adhesive. Binder systems may be selected for their ability to wet the carbon particle or current collector materials, or surfactants or other agents may be added to the binder mixture to better wet the carbon particles or graphite foil. A dispersant or a dispersing agent is a surface active substance which may be added to the carbon coating paste to improve the dispersion of the carbon particles and by preventing them from settling and clumping throughout manufacture, storage, application and film formation. A dispersants may also be added to the carbon coating paste to stabilize the binder or improve the dispersion of the binder, especially for binders that are water based adhesives.

A dispersant may be any type of surfactant or any type of emulsifier and may be selected on the basis of the hydrophilic-lipophilic balance number. The dispersants may be synthetic detergents, soaps, polymeric surfactants or any type of uncharged polymers, especially water soluble polymers or any mixtures thereof. Detergent surfactants can be anionic, cationic or nonionic or mixtures thereof. Surfactants may be sodium dodecyl sulphate, alkyl benzene sulphonate or alkyl ethoxylate and amine oxide surfactants. Dispersants that are used in the inkjet or paint and coating industry, such as Solsperse® and and Disperbyk® and many others may also be used.

The dispersant may also be a polyelectrolyte. However a polyelectrolyte may also be added in addition to a dispersant, because that makes it possible to optimize both the electrolyte and the dispersant independent of each other. For example the optimal amount of polyelectrolyte may be different than the optimal amount of dispersant and by optimizing them independently the dispersant and the polyelectrolyte may be present in the optimal amounts.

Examples of uncharged polymers are polyethylene oxide, polyethylene glycol and polyvinyl pyrrolidone (PVP, e.g. the Luvitec® range or the PVP range from International Speciality Products (ISP).

Suitable commercial binder materials may be polyacrylic based binders such as the Fastbond™ range from 3M™.

The binder may be present in the coating in a concentration of at least 1%, preferably at least 2%, more preferable at least 5% by weight of the dry coating. The binder is preferably present in the coating in a concentration of less than 50%, preferably less than 40%, more preferably less than 30%, even more preferably less than 20%, still more preferably less than 15% by weight of the dry coating.

Polyelectrolyte

A polyelectrolyte may be added. The polyelectrolyte may be both anionic or cationic. The carbon electrodes containing the polyelectrolytes can be used in FTC cells that are built either with or without ion selective membranes. In principle either anionic or cationic polyelectrolytes can be used for both the anode and the cathode. Also mixtures of anionic and cationic polyelectrolytes can be used as well as zwitterionic polymers for both the anode and the cathode. Nevertheless, it is preferred to use cationic polyelectrolytes for the anode and anionic polyelectrolytes for the cathode to obtain an increase in ion storage capacity.

Suitable cationic polyelectrolytes in the context of the present invention are for example nitrogen based polyelectrolytes. Commercially available polyelectrolytes of this type are poly ethylene imines, such as Lupasol® (ex BASF), polyquaterniums, such as the Merquat® polyquaterniums (ex Nalco), poly amines, and poly vinyl pyridine and its derivatives as well as cationic polyacrylamides, such as Accepta (ex Accepta).

Suitable anionic polyelectrolytes are sulphonated polymers and carboxylated polymers, and mixtures thereof. Commercially available anionic polyelectrolytes are polystyrene sulfonate, such as Flexan® (ex National Starch) and Polycarboxylates, such as the Sokolan™ series (ex Basf)

Both the cationic and anionic polyelectrolytes, preferably have a molecular weight of at least 200 D, more preferably at least 500 D, still more preferably at least 1000 D. The molecular weight is preferably not more than 5,000,000 D, preferably less than 100,000 D, still more preferably less than 10,000 D. The polyelectrolytes can be homodisperse or polydisperse covering a broad molecular weight range.

The polyelectrolyte may be present in the coating in a concentration of at least 0.5%, preferably at least 1%, more preferable at least 2% or even at least 4% by weight of the dry coating. The polyelectrolyte is preferably present in a concentration of not more than 30%, preferably not more than 20%, more preferably not more than 15%, or even less than 10% by weight of the dry coating. The amount of carbon and polyelectrolyte may be adjusted so as to balance the capacitance of the anode and cathode electrodes. In practice this means that more polyelectrolyte and/or carbon may be used for the anode than for the cathode electrode.

Solvent

The solvents, suitable for mixing the coating paste may be 10-50 weight %, preferably 20-40 weight %, more preferably 25-35 weight % based on the total paste of a first solvent having a first boiling point; and, 10-50 weight %, preferably 20-40 weight %, more preferably 25-35 weight % based on the total paste of a second solvent having a second boiling point.

The first solvent may be an alcohol, such as a polyol for example a triol such as as glycerol or a dyol such as ethylene glycol. The glycerol can be a food grade glycerol so that the electrode can be used in an apparatus for drinking water. The first boiling point of the first solvent is larger than 120° C. at 1 atm.

The second solvent may be a water and the second boiling point may be 100° C. at 1 atm. The second boiling point of the second solvent is lower than the first boiling point of the first solvent.

The second solvent is generally evaporated from the paste in order to form a solid coating on the current collector. The evaporation may for instance be achieved by exposure to air (ambient or heated).

After drying the coating preferably contains less than 50% solvent, more preferably less than 30%, still more preferably less than 10% of the second solvent.

The first solvent may remain in the solid coating on the current collector until the electrode in use will be flushed with water and the first solvent may be flushed away.

Method

In one embodiment the present invention provides a method for preparing a coated current collector, comprising the steps of:

preparing a coating paste comprising:
carbon;
binder; and
solvent
applying the coating paste onto a current collector; and
drying the coated current collector in order to evaporate the second solvent.

Drying the coated current collector may be done at a temperature range from 15° C., preferably 30° C. to 120° C.

For the manufacturing of the coated current collector, the carbon paste may be applied by paste-, blade-, dip- spray- or spin coating as single layers or multiple layers as well as by gravure roll coating, extrusion coating or by lamination or screen printing. For example, the screen printing process consists of forcing the carbon paste through a stencil covered substrate, e.g. Grafoil® or through a wire mesh which has been mounted in a sturdy frame. In this case the carbon paste only goes through the open areas of the stencil and is deposited onto a printing substrate, e.g. Grafoil®, positioned below the frame. Manual screen printing can be accomplished with only a few simple items: a sturdy frame, screen fabric, stencils, squeegees, and carbon paste. Automatic press equipment can be used which would greatly speed up the process. The current collector sheets may be coated on both sides with the carbon paste.

Dry Electrode

The dry electrode made by the method of the invention, as coated onto the current collector, generally has a thickness of at least 50, preferably at least about 100, more preferably at least about 200 micrometer; and preferably less than 1000, more preferably less than 750 micrometer.

Current Collector

The current collector may be any common type of current collector. The material of which the current collector is made, is a conducting material. Suitable materials are e.g. carbon, such as graphite, or carbon mixtures with a high graphite content, metal, such as copper, titanium, platinum, (stainless) steel, nickel and aluminium. The current collector is generally in the form of a sheet. Such sheet is herein defined to be suitable to transport at least 33 Amps/$m^2$ and up to 2000 Amps/$m^2$. When a surface of graphite foil is used, such surface may be corona treated, plasma etched, chemically or mechanically abraded or oxidized to enhance binder adhesion. The thickness of a graphite current collector then typically becomes from 100 to 1000 micrometer, generally 200 to 500 micrometer.

Charge Barrier Layer

Charge barriers have been disclosed in U.S. Pat. No. 6,709,560 for use in FTC. The present invention provides as an embodiment a coated current collector, as disclosed herein above, further comprising a charge barrier applied to the electrode coating layer, the charge barrier comprising a membrane, selective for anions or cations, the charge barrier being applied to the electrode coating layer as a further coating layer or as a laminate layer.

In another embodiment, the invention provides a system comprising the coated current collector according to the invention, comprising carbon, binder and polyelectrolyte, in combination with a separate conventional charge barrier as disclosed in U.S. Pat. No. 6,709,560.

Suitable membrane materials may be homogeneous or heterogeneous. Suitable membrane materials comprise anion exchange and/or cation exchange membrane materials, preferably ion exchange materials comprising strongly dissociating anionic groups and/or strongly dissociating cationic groups. Examples of such membrane materials are Neosepta™ range materials (ex Tokuyama), the range of PC-SA™ and PC-SK™ (ex PCA GmbH), ion exchange membrane materials ex Fumatec, ion exchange membrane materials Ralex™ (ex Mega) or the Excellion™ range of heterogeneous membrane material ex Snowpure).

Applications of the Coated Current Collector FTC

The coated current collectors are especially useful in FTC devices that require low system cost for example in domestic appliances such as coffee makers, espresso machines, washing machines, dish washers, refrigerators with ice or water dispensers, steam irons, etc, where the removal of hardness ions such as calcium and magnesium, as well as other ions is beneficial. They can also be used for residential water treatment such as point of use devices as well as point of entry devices for whole households. These electrodes can also be used for commercial and industrial applications, e.g. water treatment in agriculture (e.g. treatment of ground water and surface water), boiler water, cooling towers, process water, pulp and paper, laboratory water, waste water treatment, mining as well as for the production of ultra pure water. Finally the electrodes may be used for the removal of problem ions such as nitrate in e.g. swimming pools and arsenic and/or fluoride in e.g. ground water.

The invention will now be illustrated by means of the following non-limiting examples.

Example 1

Add tap water: 32.67 wt %
Add polysulfonate 0.76%
Mix
Add carbon black 1.69 wt %
Mix
Add glycerol: 32.54 wt %
Mix
Add activated carbon (ex Norit) 29.58 wt % (carbon)
Mix
Add binder 2.76 wt %
Spread the paste on the graphite foil (speed: 5 mm/s) and dry the coating paste to make a coated current collector.

Example 2

During the electrode coating process, whereby only one solvent, e.g. water is used, then some water of the electrode paste needs to be evaporated in order to cure the binder and stabilize the electrode. On the other hand, some water needs to stay in the electrode to avoid electrode defects. For example, electrodes from which the water has been fully evaporated normally show cracks, especially at larger thicknesses, i.e. thicknesses larger than 100 micrometer.

The need to keep electrodes between these two levels of moisture not only makes the electrode manufacturing process much more complex but also give problems when using them due to its short handling time. Water is evaporated when electrodes are exposed to air, the average handling time of standard electrode is 20 minutes, after this time defects start appearing.

In order to solve this problem, we prepare a carbon paste in two different solvents with different boiling points.

In this example 50% glycerol was added in the formulation replacing part of the water. As a consequence, the water of the electrode will be evaporated during the coating (drying) process while the glycerol will remain in the electrode due to its high boiling point (290° C.) ensuring that the electrodes do not crack and to prevent that they become brittle. In addition, the electrodes that contain glycerol are much more flexible. The handling time of the electrodes by using a second solvent goes from about 20 minutes to several hours or even weeks and months.

Advantages

No Defects in Electrodes

Glycerol electrodes have no cracks or surface defects due to oven drying. The electrodes are also flexible and can be bended, this way the electrodes can be produced in roles. Another advantage is that the electrode thickness of glycerol electrodes can be larger, which results in a higher ion storage capacity of the electrodes in the FTC apparatus.

Improved Handling Time

Figures 3A, 3B, 3C, 3D, 3E:
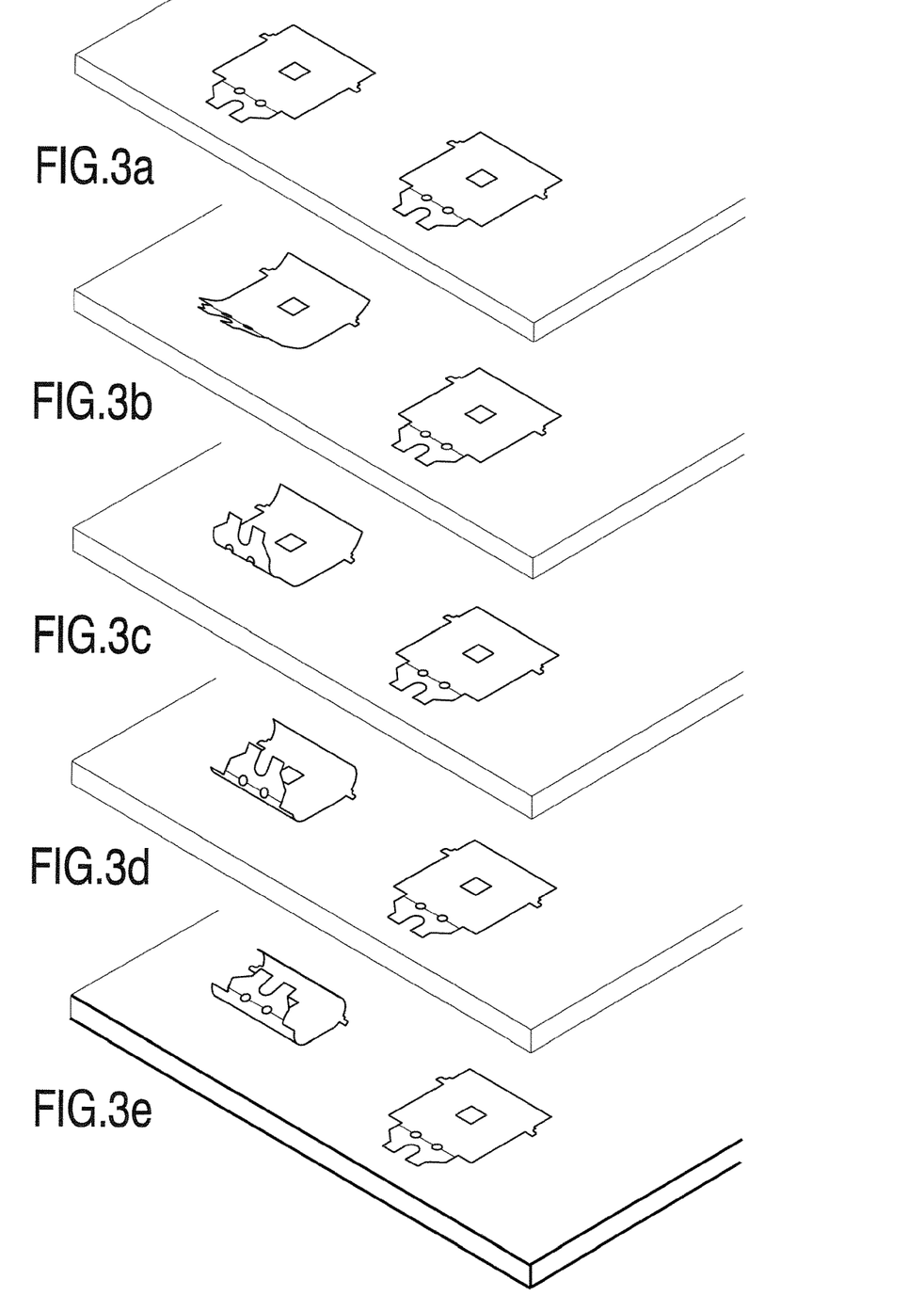
FIGS. 3a, 3b, 3c, 3d and 3e show a prior art and a glycerol electrode being photographed every 30 minutes to show the effects of drying.

A standard and a glycerol electrode were put on a table at a room temperature (20° C.) being photographed (the prior art electrode is in the background and the glycerol electrode in the foreground of the picture) every 30 minutes from FIG. 3a (initial), FIG. 3b (after 30 minutes), FIG. 3c (after 60 minutes), FIG. 3d (after 90 minutes), and FIG. 3e (after 120 minutes). The prior art electrode was soaked in water right after punching so as to prevent drying before the start of the experiment; on the other hand the glycerol electrode had already been exposed to air for six months.

Figure 4:
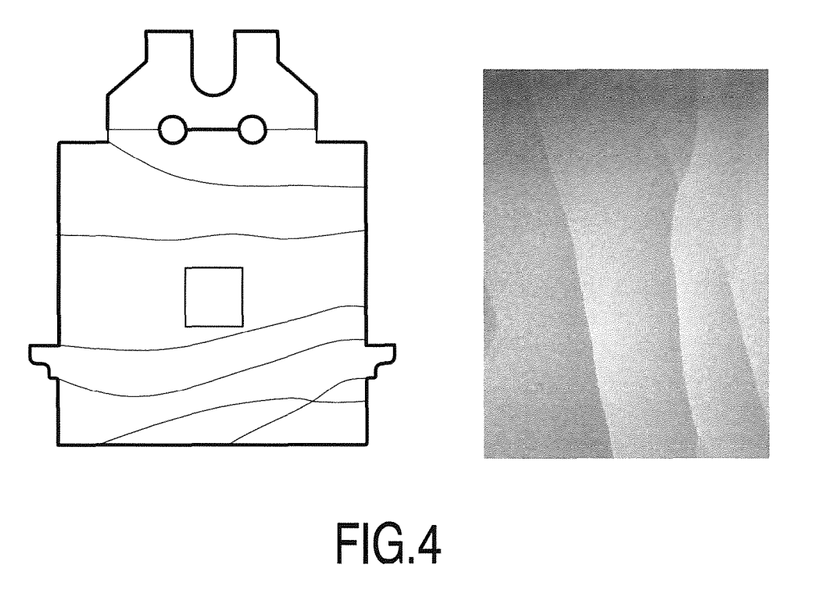
FIG. 4 shows the cracks in the prior art electrode after being dried for 120 minutes; and, FIG. 5 shows the roughness average of 24 electrodes.

FIG. 4 discloses the cracks in the prior art electrode after being dried for 120 minutes to ambient temperatures and after they have been subsequently flattened.

Electrode handling time increases from about 20 minutes for the prior art electrode to nearly infinite for the glycerol electrode. That gives the next benefits:

Possibility of dry stacking, hence, easier to automate the building process.

No need to remoisturize electrodes (by spraying water) at the end of the coating process. That prevents coating line oxidation, therefore extending the life of the machine.

More Robust Process

Easier and much more accurate to set the final solvent content. That reduces moisture variation of the end product. Consequently, much less electrodes are out of specification, so fewer rejections.

Open New Possibilities for the Future Development of Electrodes

Figure 5:
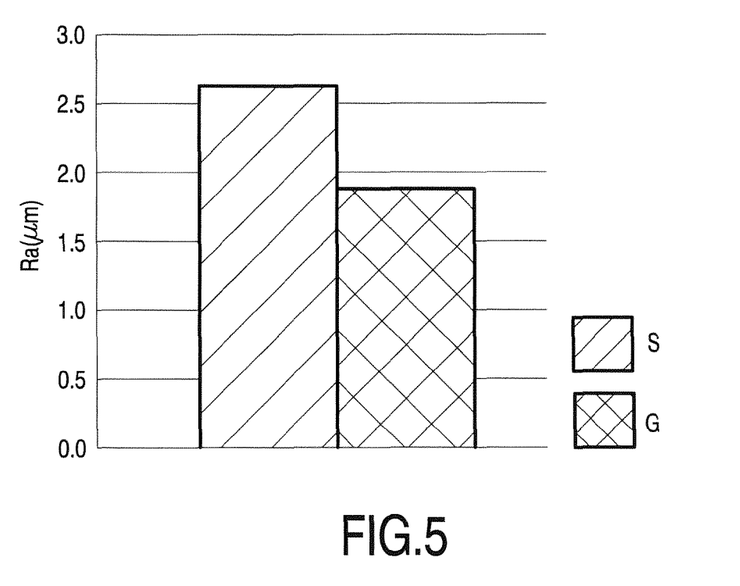

Since glycerol will not be evaporated at water evaporation conditions, electrodes can go through the oven of the coating line several times allowing:

Double side coated electrodes. Coating electrodes at both sides of the current collector Coat membranes on electrodes Roughness Test FIG. 5 shows the roughness average of 24 electrodes. Glycerol electrode G according to an embodiment of the invention is 25% less rough than standard electrodes S according to the prior art. This improves the contact between electrode and membrane during stack building which improves the quality of the apparatus for deionizing water.

In an embodiment, there is provided a method to prepare a coated current collector electrode for a flow through capacitor, the method comprising: preparing a coating paste comprising by weight %: 10-50 weight % of carbon having a specific surface area of at least 500 $m^2/g$; 0.3-5 weight % of a binder; 10-50 weight % based on the total paste of a first solvent having a first boiling point; and 10-50 weight % based on the total paste of a second solvent having a second boiling point, the second boiling point being lower than the first boiling point; applying the coating paste onto a current collector; and allowing the second solvent in the coating paste applied on the current collector to evaporate at a temperature lower than the first boiling point, the first boiling point being larger than 120° C. at 1 atm.

In an embodiment, the first solvent is present in 20-40 weight %, based on the total paste. In an embodiment, the first solvent is present in 25-35 weight %, based on the total paste. In an embodiment, the first solvent comprises an alcohol. In an embodiment, the first solvent comprises a polyol. In an embodiment, the first solvent comprises a triol. In an embodiment, the triol is glycerol. In an embodiment, the glycerol is a food grade glycerol. In an embodiment, the first solvent comprises a glycol. In an embodiment, the second boiling point is 100° C. at 1 atm and the second solvent is water. In an embodiment, the first boiling point is larger than 120° C. at 1 atm to ensure that enough of the first solvent will remain in the coated current collector to avoid cracking of the coated current collector during storage and/or transport. In an embodiment, the first boiling point is preferably larger than 120° C., more preferably larger than 160° C., even more preferably larger than 200° C. even more preferably larger than 240° C. and most preferably above 280° C. at 1 atm and preferably below 350° C. more preferably below 300° C. at 1 atm. In an embodiment, the coating paste is applied by paste-, blade-, dip- spray- or spin coating or by gravure roll coating, extrusion coating or by lamination or screen printing.

In an embodiment, there is provided a coated current collector for a flow through capacitor obtainable by a method as described herein.

In an embodiment, there is provided an apparatus for removal of ions, the apparatus being provided with a housing, the apparatus comprising: a water inlet for water entering an interior of the housing; a water outlet for letting water out of the interior of the housing; a first and second coated current collector; and a spacer for separating the first and second coated current collectors and allowing water to flow in between the first and second coated current collector; wherein the coated current collector as provided herein.

In an embodiment, there is provided a coating for a current collector for a flow through capacitor comprising: 15-80 weight % of carbon having a specific surface area of at least 500 $m^2/g$; and, 0.45-7.5 weight % of binder, wherein the coated current collector further comprises: 15-80 weight % of a first solvent having a boiling temperature at atmospheric pressure larger than 120° C.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another or subsequent, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. A method to prepare a coated current collector electrode for a flow through capacitor, the method comprising:
   preparing a coating paste comprising by weight %:
   10-50 weight % of carbon having a specific surface area of at least 500 $m^2/g$;
   0.3-5 weight % of a binder;
   10-50 weight % based on the total paste of a first solvent having a first boiling point; and
   10-50 weight % based on the total paste of a second solvent having a second boiling point, the second boiling point being lower than the first boiling point;
   applying the coating paste onto a current collector; and
   allowing the second solvent in the coating paste applied on the current collector to evaporate at a temperature lower than the first boiling point, the first boiling point being larger than 120° C. at 1 atm.

2. The method according to claim 1, wherein the first solvent is present in 20-40 weight %, based on the total paste.

3. The method according to claim 1, wherein the first solvent is present in 25-35 weight %, based on the total paste.

4. The method according to claim 1, wherein the first solvent comprises an alcohol.

5. The method according to claim 1, wherein the first solvent comprises a polyol.

6. The method according to claim 1, wherein the first solvent comprises a triol.

7. The method according to claim 6, wherein the triol is glycerol.

8. The method according to claim 7, wherein the glycerol is a food grade glycerol.

9. The method according to claim 1, wherein the first solvent comprises a glycol.

10. The method according to claim 1, wherein the second boiling point is 100° C. at 1 atm and the second solvent is water.

11. The method according to claim 1, wherein the first boiling point is larger than 120° C. at 1 atm to ensure that enough of the first solvent will remain in the coated current collector to avoid cracking of the coated current collector during storage and/or transport.

12. The method according to claim 1 wherein the first boiling point is larger than 120° C. and below 350° C. at 1 atm.

13. The method according to claim 1, wherein the coating paste is applied by paste-, blade-, dip- spray- or spin coating or by gravure roll coating, extrusion coating or by lamination or screen printing.

14. A coated current collector for a flow through capacitor obtained by the method according to claim 1, the coated current collector having a dried, obtained coating comprising:
   the carbon;
   the binder; and
   more than zero but less 50 weight % of the first solvent having the first boiling point larger than 120° C. at 1 atm.

15. An apparatus for removal of ions, the apparatus being provided with a housing, the apparatus comprising:
   an inlet configured to let water enter an interior of the housing;
   an outlet configured to let water out of the interior of the housing;
   a first coated current collector and a second coated current collector; and
   a spacer provided between the first and second coated current collectors and configured to allow water to flow in between the first and second coated current collectors,
   wherein the first and/or second coated current collector is according to claim 14.

16. The coated current collector of claim 14, wherein the obtained coating comprises less than 10 weight % of the first solvent.

17. The coated current collector of claim 14, further comprising a charge barrier membrane, the charge barrier membrane selective for either anions or cations.

18. The coated current collector of claim 14, wherein the obtained coating comprises a polyelectrolyte.

19. The coated current collector of claim 14, wherein the obtained coating has a thickness of at least 50 micrometers.

20. The coated current collector of claim 14, wherein the obtained coating comprises at least 50 weight % of the carbon.

* * * * *